(12) United States Patent
Slavens et al.

(10) Patent No.: US 10,094,240 B2
(45) Date of Patent: Oct. 9, 2018

(54) ANTI-DEFLECTION FEATURE FOR ADDITIVELY MANUFACTURED THIN METAL PARTS AND METHOD OF ADDITIVELY MANUFACTURING THIN METAL PARTS

(71) Applicant: United Technologies Corporation, Hartford, CT (US)

(72) Inventors: Thomas N. Slavens, Vernon, CT (US); Brooks E. Snyder, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 597 days.

(21) Appl. No.: 14/620,256

(22) Filed: Feb. 12, 2015

(65) Prior Publication Data

US 2016/0237848 A1    Aug. 18, 2016

(51) Int. Cl.
  *F01D 25/12*  (2006.01)
  *B22F 3/105*  (2006.01)
  *B22F 5/00*   (2006.01)
  *F01D 5/14*   (2006.01)

(52) U.S. Cl.
  CPC .......... *F01D 25/12* (2013.01); *B22F 3/1055* (2013.01); *B22F 5/009* (2013.01); *F01D 5/147* (2013.01); *F05D 2220/32* (2013.01); *F05D 2230/13* (2013.01); *F05D 2230/30* (2013.01); *F05D 2230/31* (2013.01); *F05D 2260/20* (2013.01); *F05D 2260/201* (2013.01); *F05D 2260/2214* (2013.01); *F05D 2300/177* (2013.01); *Y02P 10/295* (2015.11)

(58) Field of Classification Search
  CPC ........ B22F 3/1055; B22F 5/009; F01D 25/12; F01D 5/147; F05D 2220/32; F05D 2230/13; F05D 2230/30; F05D 2230/31; F05D 2260/20; F05D 2260/201; F05D 2260/2214; F05D 2300/177
  See application file for complete search history.

(56) References Cited

U.S. PATENT DOCUMENTS 4,981,166 A * 1/1991 Brown .................... B22C 9/088
                                                     164/137
7,670,675 B2    3/2010 Heselhaus
2009/0183850 A1 7/2009 Morrison et al.
(Continued)

FOREIGN PATENT DOCUMENTS

EP    2975351 A1    1/2016
WO    2012131481 A1 10/2012
(Continued)

OTHER PUBLICATIONS

Extended European Search Report, for European Patent Application No. 16155222.9, dated Jul. 13, 2016, 8 pages.

*Primary Examiner* — William McCalister
(74) *Attorney, Agent, or Firm* — Kinney & Lange, P.A.

(57) ABSTRACT

A conduction riser additively manufactured onto thin metal parts, the conduction riser extending in a build direction of the thin metal part and traversing the thin metal part as the conduction riser extends in the build direction. The conduction riser transferring heat from the upper layers of additively manufactured part during manufacturing, preventing thermal deflection of the part.

13 Claims, 6 Drawing Sheets

(56) References Cited

U.S. PATENT DOCUMENTS

| | | |
|---|---|---|
| 2011/0099809 A1 | 5/2011 | Hovel et al. |
| 2012/0222306 A1 | 9/2012 | Mittendorf et al. |
| 2013/0108460 A1 | 5/2013 | Szwedowicz et al. |
| 2013/0319580 A1 | 5/2013 | Ozbaysal |
| 2013/0224008 A1 | 8/2013 | Cheung et al. |
| 2013/0280092 A1 | 10/2013 | Xu |
| 2013/0316084 A1 | 11/2013 | Szuromi et al. |
| 2014/0053956 A1 | 2/2014 | Etter et al. |
| 2014/0079540 A1 | 3/2014 | Morris et al. |
| 2014/0199175 A1 | 7/2014 | Godfrey et al. |
| 2014/0202163 A1 | 7/2014 | Johnson et al. |
| 2014/0241871 A1 | 8/2014 | Gregory et al. |
| 2014/0295087 A1 | 10/2014 | Rickenbacher et al. |

FOREIGN PATENT DOCUMENTS

| | | |
|---|---|---|
| WO | 2014150365 A1 | 9/2014 |
| WO | 2014202352 A1 | 12/2014 |

\* cited by examiner

ANTI-DEFLECTION FEATURE FOR ADDITIVELY MANUFACTURED THIN METAL PARTS AND METHOD OF ADDITIVELY MANUFACTURING THIN METAL PARTS

BACKGROUND

The present invention relates to additively manufacturing parts, and in particular, to forming an anti-deflection features on a component manufactured using an additive manufacturing process.

Additive manufacturing is a process whereby components are manufactured in a layer-by-layer fashion. Additive manufacturing allows complex design features to be incorporated into parts where those complex design features had proved infeasible using previous manufacturing techniques. First, a three-dimensional model of the component is converted into a plurality of layers by a computer program. Next, a layer of powder material is deposited on a work platform. An additive manufacturing machine solidifies the powder into a first layer of the component. The additive manufacturing process may include, but is not limited to, sterolithography, electron beam melting, or laser powder deposition. The process of building the component a layer at a time is repeated until the complete component is manufactured.

When using additive manufacturing, some parts cannot withstand the stresses imparted during additive manufacturing. Where parts cannot withstand the stresses imparted, the part must either be manufactured using another process or the part must be supported throughout the build process. For example, thin metal parts cannot efficiently dissipate heat as new layers are added to the part, which causes the part to deflect and deform during cooling. To allow for heat transfer, vestigial support structures may be utilized during additive manufacturing to prevent deflection. The support structures are then machined off of the completed part. Alternatively, to avoid issues that arise during build, thin metal parts are typically manufactured out of sheet metal and undergo a tooling process to shape them to a final, desired shape.

SUMMARY

According to an embodiment of the present invention, a method of manufacturing a gas turbine component includes generating data defining a thin metal part. A build direction of the thin metal part is then determined. Then data is generated defining at least one conduction riser, the at least one conduction riser located on a surface of the thin metal part. The thin metal part and the at least one conduction riser are manufactured using an additive manufacturing process.

According to another embodiment of the present invention, a turbine component comprises a thin metal part made with an additive manufacturing process. The turbine component also includes a conduction riser attached to a surface of the thin metal part.

According to yet another embodiment of the present invention, a conduction riser for an additively manufactured part includes a projection additively manufactured onto a surface of the additively manufactured thin metal part, the projection traversing the surface of the thin metal part.

DETAILED DESCRIPTION

Figure 1:
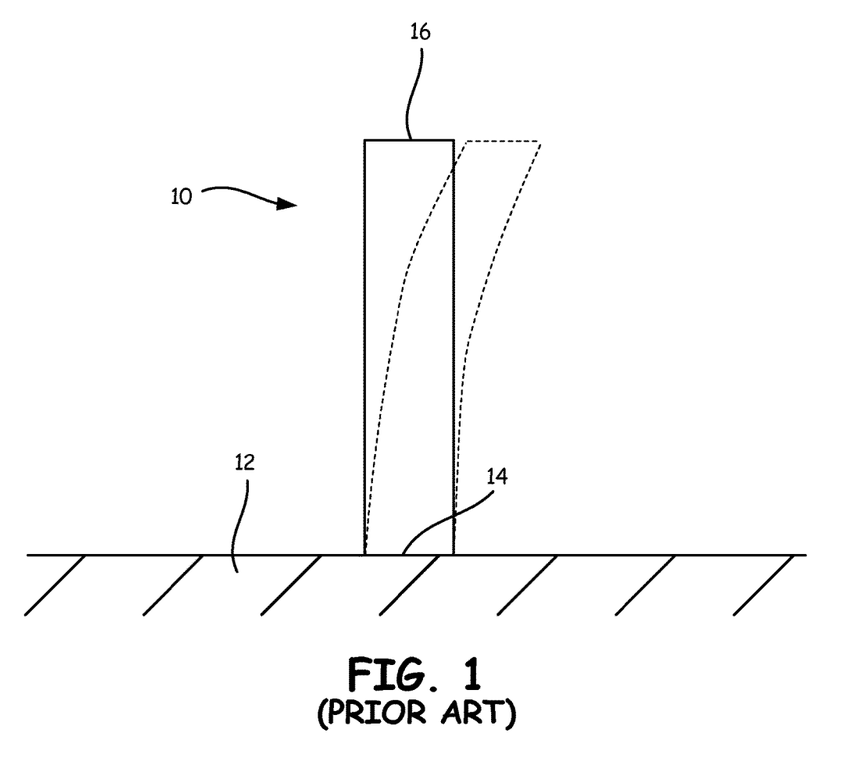
FIG. 1 is an elevation view of a prior art thin metal part.

FIG. 1 is an elevation view of thin metal part 10 and platform 12. Thin metal part 10 includes base end 14 and build end 16. Thin metal part 10 extends between base end 14 and build end 16. Base end 14 is adjacent platform 12.

Thin metal part 10 is fabricated through an additive manufacturing process. In general, additive manufacturing of metallic parts includes building a part layer by layer. Building each layer of the part typically involves solidifying a powder material with a laser, based upon data defining the part.

Due to the high temperatures involved in additive manufacturing, the part must be cooled prior to use. The strain interaction between melt-pool contraction, during solidification, and expansion-induced compression of the solid metal near the melt pool create localized stresses that impart residual strain within the thin metal part during build. The direction and magnitude of the strains imparted depend on the heat dissipation from the active build layer into the previously consolidated layers. The layers built near platform 12, typically within 3.175 mm (0.125 inches) of platform 12, cool quickly due to heat dissipation through platform 12. The rate of heat dissipation is highly dependent on the local thermal mass, and as such, as layers are added further from platform 12, the local mass through which heat can be dissipated diminishes. These layers retain the heat generated through the manufacturing process, which leads to uneven cooling and an increase in internal thermal strains.

Typically, thermal stresses may be relieved through a post-build heat treatment process. The post-build heat treatment process generally involves heating the additively manufactured part to a predetermined, uniform temperature and then uniformly cooling the part back to an ambient temperature. Care must be taken that the part cools at a uniform rate to prevent the impartation of additional strains within the part.

In thin metal parts, however, the thermal strains imparted during the additive manufacturing process are so great that the thin metal part deflects or warps as shown in dashed lines in FIG. 1. Thin metal parts are parts that have a length to thickness ratio greater than about 3.5:1. Metals and alloys with lower conductivity, such those based on nickel and cobalt, are particularly susceptible to uneven cooling and thermal strains. Due to the low conductivity of these metals and alloys, the upper layers of the thin metal parts retain much more heat than lower layers during the additive manufacturing process. As such, the upper layers of the thin metal parts solidification rate and strain profile is much different than those of the lower portions of the part, which can lead to pealing or thermal deflection of the upper portions of the part during build. Furthermore, even when the thin metal part does not deflect during build, the mismatched thermal strains may cause deflection during the post-build heat treatment process. Thus, thin metal parts are typically machined from sheet metal. Where thin metal parts are additively manufactured, numerous vestigial support structures must be utilized to support the thin metal part during build, to prevent thermal deflection until the thermal stresses can be relieved through the post-build heat treatment process. However, these vestigial support structures must be machined off of the finished part after build.

Figure 2:
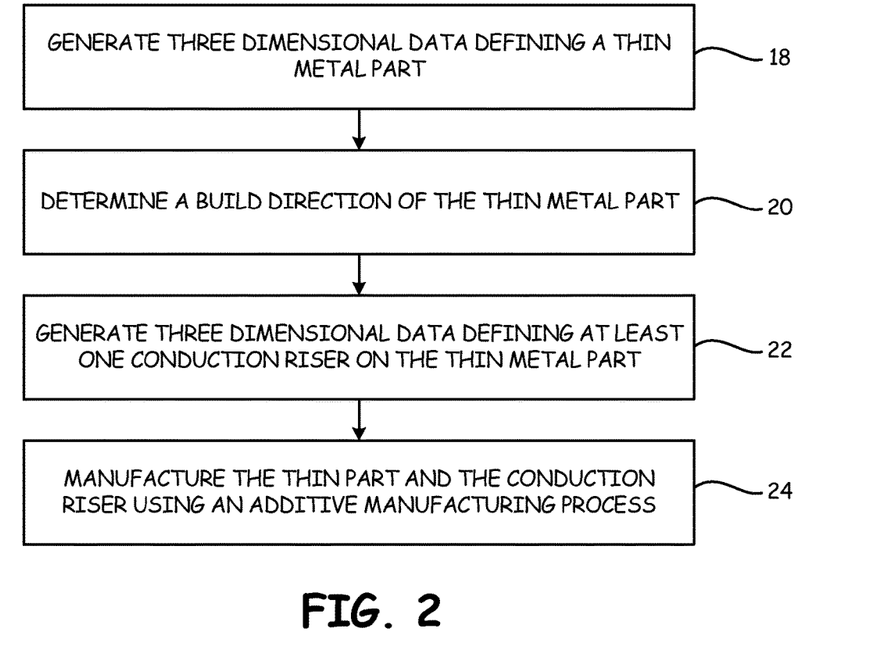
FIG. 2 is a flowchart showing steps for additively manufacturing a thin metal part.

FIG. 2 is a flowchart showing steps for additively manufacturing a thin metal part. The flowchart includes steps 18-24. Step 18 includes generating data defining a thin metal part. Step 20 includes determining a build direction of the thin metal part. Step 22 includes generating data defining at least one conduction riser, the at least one conduction riser located on a surface of the thin metal part. Step 24 includes manufacturing the thin metal part and the conduction riser using an additive manufacturing process.

Step 18 includes generating data defining a thin metal part, such as a superalloy part for a gas turbine engine. Data defining a thin metal part is typically generated using a computer program, such as a three dimensional computed aided drafting and design program (3D CAD). The initial data generated gives a three dimensional representation of the thin metal part. The geometry of the three dimensional model is then defined, typically by converting 3D CAD file to a stereolithography (STL) file format. Defining the geometry of the thin metal part provides data for the surfaces of the thin metal part. Generating the data defining a thin metal part generates a computer model that may be communicated to an additive manufacturing machine for additively manufacturing a part. While certain steps for generating the data defining a thin metal part have been described, it is understood that the exact steps taken to generate the data defining a thin metal part can vary.

Step 20 includes determining a build direction of the thin metal part. The build direction of the thin metal part is the direction in which layers are added to the thin metal part throughout the additive manufacturing process. Thus, the build direction is the direction that the part grows as additional layers are added through an additive manufacturing process. The build direction may be determined in any way known in the art.

Step 22 includes generating data defining at least one conduction riser, the at least one conduction riser located on a surface of the thin metal part. As discussed above with regard to step 18, the data is typically generated using a computer program. Initial data defining the at least one conduction riser may be generated through a known computer program, such as 3D CAD. The initial data is then defined by a geometry of the three dimensional model, typically by converting 3D CAD file to an STL file format. While certain steps for generating the data defining at least one conduction riser have been described, it is understood that the exact steps taken can vary.

The data defining at least one conduction riser is combined with the data defining a thin metal part, with the at least one conduction riser located on a surface of the thin metal part. Preferably, the at least one conduction riser is located on the thin metal part such that the at least one conduction riser extends in the build direction. The conduction riser may be located on any suitable surface of the thin metal part, which allows the at least one conduction riser to be located at a location that does not interfere with the functionality or design of the thin metal part. Additionally, the conduction riser may be placed at a location where the conduction riser forms a mating projection for mating the thin metal part with another component, such as another component in a gas turbine engine. The conduction riser may also be machined off of the thin metal part after build where the design of the thin metal part may require that the conduction riser is located at a spot that would interfere with the functionality of the thin metal part. As discussed below with reference to FIG. 3, the at least one conduction riser preferably traverses a surface of the thin metal part in an oscillating manner as the at least one conduction riser extends in a build direction.

Step 24 includes manufacturing the thin metal part and the at least one conduction riser using an additive manufacturing process. Additively manufacturing the thin metal part and the at least one conduction riser includes building the thin metal part and the at least one conduction riser layer by layer. The data generated in steps 18 and 22 is sliced into a plurality of layers, which data is uploaded to an additive manufacturing machine. The additive manufacturing machine forms a first layer of the part on a platform. A second layer of the part is formed on top of the first layer of the part. Subsequent layers are built, in the build direction, until the final part has been fully manufactured. The conduction riser allows for an efficient transfer of energy through the build such that the temperature soak at the upper layers of the thin metal part is diminished, which leads to a smaller consolidation temperature difference between build layers. Any additive manufacturing process may be employed to fabricate the part, including but not limited to direct metal laser sintering, electron beam freeform fabrication, electron-beam melting, selective laser melting, or selective laser sintering. Furthermore, the exact steps taken to additively manufacture the thin metal part and the at least one conduction riser can vary.

Figure 3:
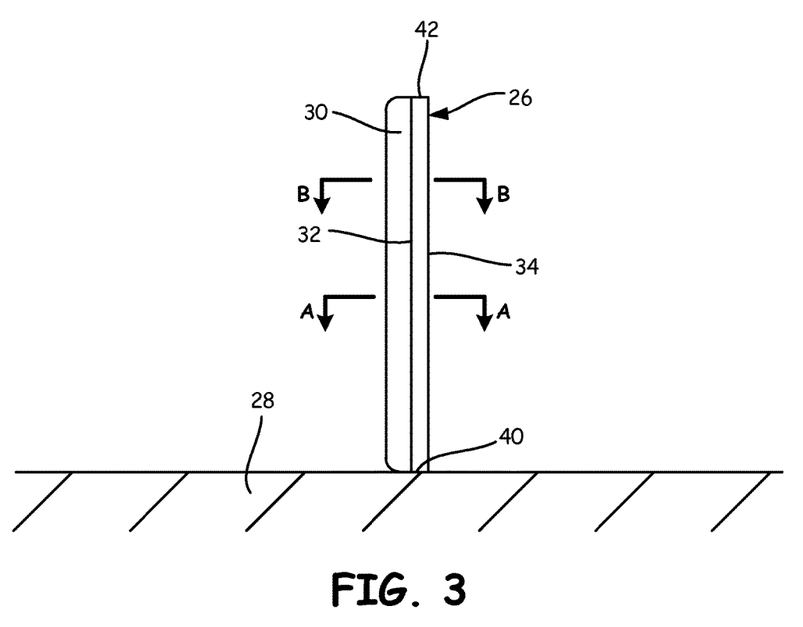
FIG. 3 is an elevation view of a thin metal part and a conduction riser.
Figure 3A:
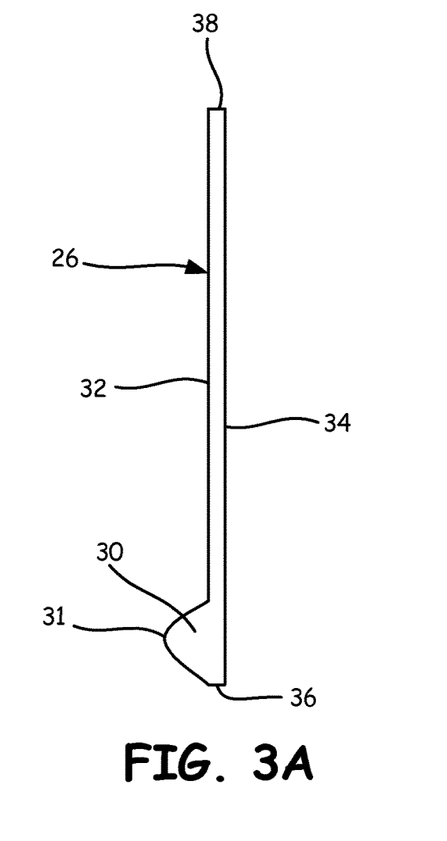
FIG. 3A is a cross-sectional view of a thin metal part and a conduction riser taken along line A-A in FIG. 3.
Figure 3B:
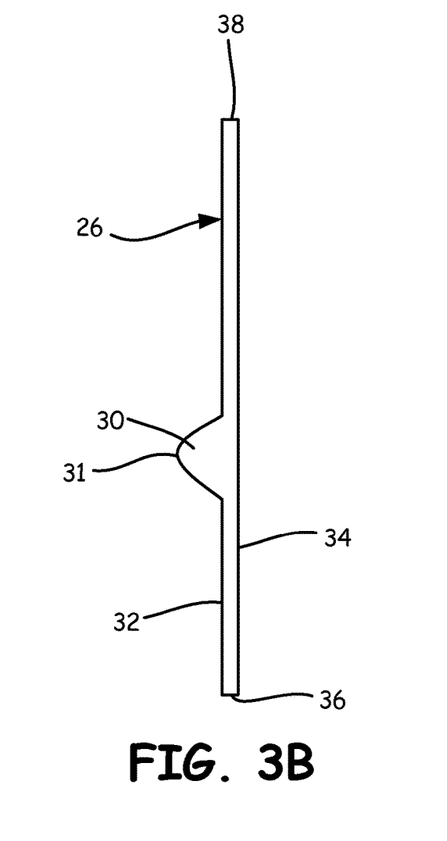
FIG. 3B is a cross-sectional view of a thin metal part and a conduction riser taken along line B-B in FIG. 3.

FIG. 3 is an elevation view of thin metal part 26, platform 28, and conduction riser 30. FIG. 3A is a cross-sectional view of thin metal part 26 taken along line A-A in FIG. 3. FIG. 3B is a cross-sectional view of thin metal part 26 taken along line B-B in FIG. 3. Thin metal part 26 includes first face 32, second face 34, first end 36, second end 38, base end 40, and build end 42.

Conduction riser 30 is attached to first face 32 of thin metal part 26. Conduction riser 30 and thin metal part 26 are fabricated using an additive manufacturing process. Base end 40 includes the initial layers of thin metal part 26 formed by the additive manufacturing process. The additive manufacturing process continues to add layers in a build direction, towards build end 42, until thin metal part 26 is fully formed. Any additive manufacturing process may be employed to fabricate thin metal part 26 and conduction riser 30, including but not limited to those additive manufacturing processes previously mentioned. While the steps taken to additively manufacture a part have been described, it is understood that the exact steps taken during additive manufacturing can vary.

Conduction riser 30 may be integrally manufactured on first face 32 of thin metal part 26. Thus, as a layer of thin metal part 26 is fabricated, a layer of conduction riser 30 is also fabricated and projects from first face 32. In this way, conduction riser 30 extends in a build direction of thin metal part 26 as thin metal part 26 is built in the build direction. In addition, conduction riser 30 forms a curved conduction path on thin metal part 26 (best seen in FIG. 4). While conduction riser 30 is preferably integrally manufactured on first face 32 of thin metal part 26, it is understood that conduction riser 30 may be located on any surface of thin metal part 26 such that conduction riser 30 still transfers heat from the upper layers during build. In this way, conduction riser 30 may be located on thin metal part 26 such that conduction riser 30 does not does not interfere with the functionality of an earlier design of thin metal part 26.

As discussed above with regard to FIG. 1, a typical additive manufacturing process imparts thermal stresses in the upper layers of thin metal part 26 that can cause deflection and warping due to uneven cooling. Conduction riser 30 evenly distributes heat from the upper layers of thin metal part 26 during the additive manufacturing process. Conduction riser 30 projects from first face 32, as shown in FIG. 3A. In the present embodiment conduction riser 30 is a continuous bulge normal through a build direction of the thin metal part. In the embodiment shown, conduction riser 30 has a generally triangularly-shaped cross-section with fillet 31 at an apex of conduction riser 30. The ratio of a thickness of conduction riser 30, measured as a distance from first face 32 to the apex of conduction riser 30, to a thickness of thin metal part 26 can be between about 0.5:1 and 2.5:1. More preferably, the ratio between the thickness of conduction riser 30 and the thickness of thin metal plate 26 is about 1:1 and 1.3:1. While conduction riser 30 is described as having a triangularly-shaped cross-section with fillet 31, it is understood that conduction riser 30 may have any suitable cross-section for distributing heat from the upper layers of thin metal part 26. In addition, the ratio of a thickness of conduction riser 30 to a thickness of thin metal part 26 is a function of a number of factors, including the heat generated by the manufacturing process and the conduction properties of the metal that conduction riser 30 and thin metal part 26 are manufactured from. As such, where thin metal part 26 includes a plurality of conduction risers 30, the thickness of one of the plurality of conduction risers 30 may vary from the thickness of another of the plurality of conduction risers depending on the thickness of thin metal part 26 and the thermal stresses generated by the additive manufacturing process. The thickness of thin metal part 26 may vary across the part and conduction risers 30 may similarly vary to ensure uniform cooling.

As layers are added to thin metal part 26, conduction riser 30 distributes heat away from the upper layers of thin metal part 26, preventing thermal stresses from building to a critical point where thin metal part 26 would deform and warp. While some thermal stresses may still build in thin metal part 26, those thermal stresses may then be eliminated through a post-build heat treatment process, as is known in the art.

Referring specifically to FIGS. 3A and 3B, conduction riser 30 traverses first face 32 of thin metal part 26 between first end 36 and second end 38 to form smooth undulating curves. As shown in FIG. 3A conduction riser 30 is located nearly adjacent first end 36. As layers are added during the additive manufacturing process, growing thin metal part 26 and conduction riser 30 in the build direction, conduction riser 30 traverses across first face 32, as shown by the position of conduction riser 30 in FIG. 3B. Thus, as build layers are added to thin metal part 26, conduction riser 30 traverses from first end 36 towards second end 38. Conduction riser 30 is designed such that when conduction riser 30 reaches a predetermined point on first face 32, conduction riser 30 begins transitioning back towards first end 36. In this way, conduction riser 30 forms a curved conduction path on thin metal part 26. Conduction riser 30 forming smooth undulating curves on first face 32 allows for an even distribution of heat from the additively manufactured layers, thus evenly cooling thin metal part 26. While conduction riser 30 has been described as forming a smooth undulating conduction path, it is understood that the conduction path formed by conduction riser 30 may take any shape suitable for evenly cooling the upper layers.

Figure 4:
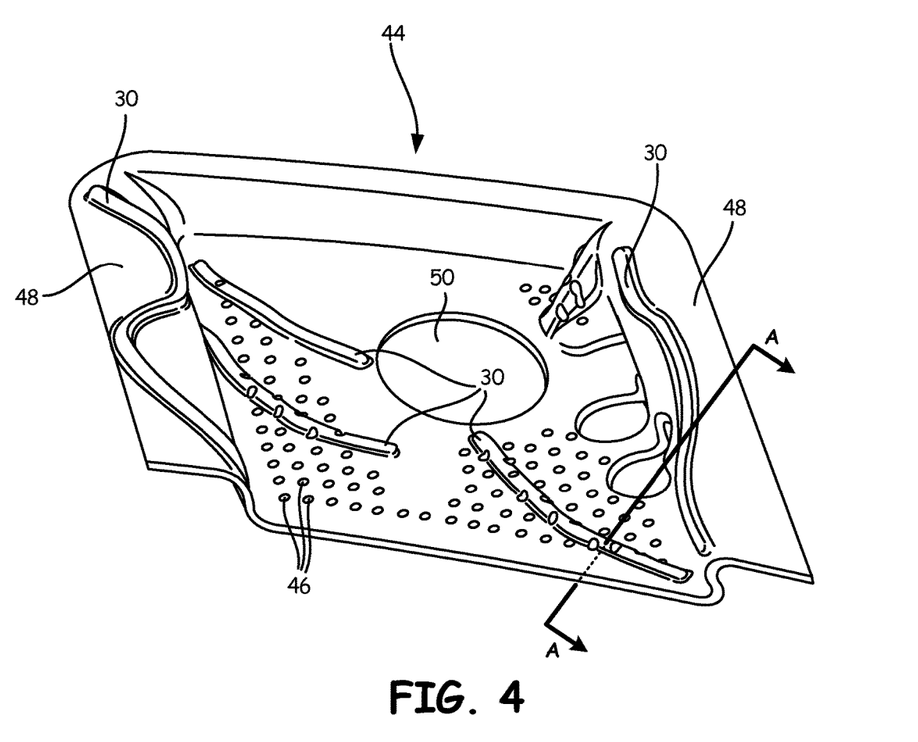
FIG. 4 is a perspective view of an impingement baffle with conduction risers.
Figure 4A:
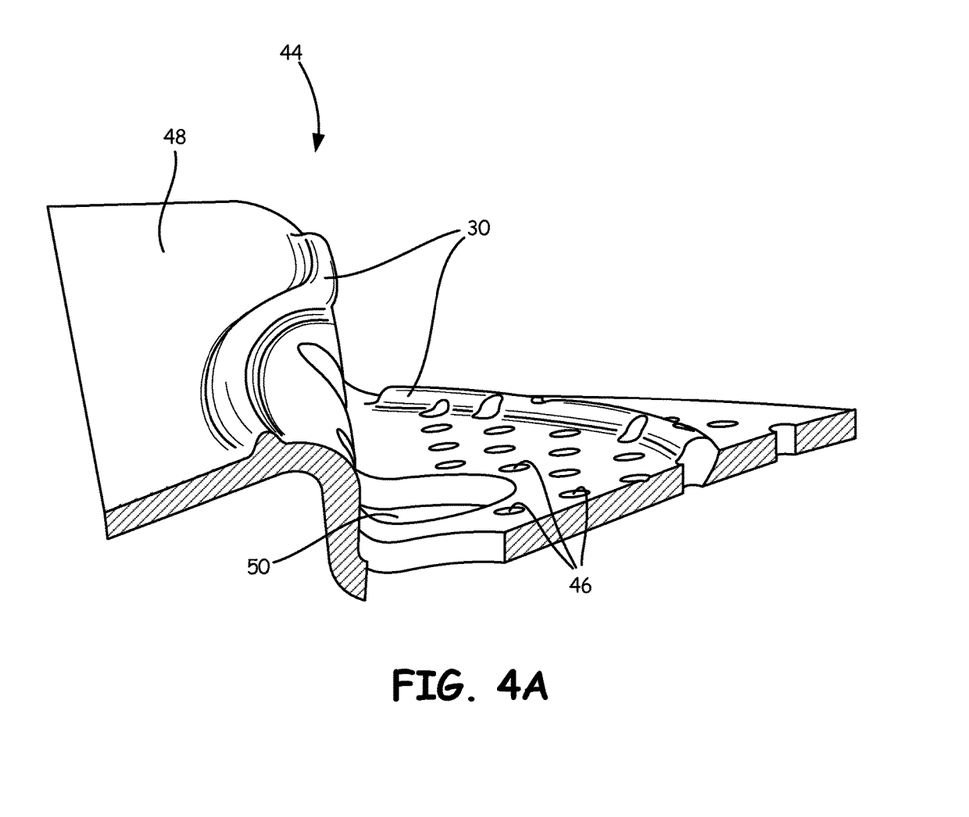
FIG. 4A is a cross-sectional view of an impingement baffle with conduction risers taken along line A-A in FIG. 4.

FIG. 4 is a perspective view of baffle 44 with conduction risers 30. FIG. 4A is a cross-sectional view of baffle 44 taken along line A-A in FIG. 4. FIGS. 4 and 4A will be discussed together. Baffle 44 includes impingement holes 46, flanges 48, and apertures 50. Conduction risers 30 are located on a first side of baffle 44.

Baffle 44 is a thin metal part that is manufactured using an additive manufacturing process. In the present embodiment, baffle 44 is manufactured from a nickel superalloy, but any suitable material can be used in alternate embodiments. As discussed above with regard to FIG. 2, the additive manufacturing processes build parts in layers by solidifying one layer of the part at a time, with subsequent layers built upon previous layers. Gas turbine components, such as vanes and airfoils, may operate in environments with a temperature that exceeds the melting point of the material that the gas turbine component is manufactured from. Baffle 44 allows cooling air flow to flow through impingement holes 46 and onto a cooled gas turbine part. Baffle 44 may be secured to a cooled gas turbine part, such as a vane or airfoil, to direct cooling air onto the cooled gas turbine part. Cooling air flows through impingement holes 46 and impinges against an inner surface of the cooled gas turbine part. The cooling air sufficiently cools the cooled gas turbine component to allow the cooled gas turbine component to operate in those high temperature environments. Impingement holes 46 accelerate the cooling air flowing through impingement baffle, and direct the cooling air onto the cooled gas turbine part.

Baffle 44 includes a plurality of conduction risers 30. Conduction risers 30 are located on the thin metal part, here baffle 44, in such a way that heat is efficiently and uniformly conducted away from the upper build layers during the additive manufacturing process. A plurality of conduction risers 30 may be used in conjunction with each other to ensure that adequate cooling of the upper layers occurs. Conduction risers 30 form a plurality of conduction paths for distributing heat from the upper layers of the additively manufactured baffle 44. As shown, the conduction paths form a series of undulating curves on baffle 44. While each conduction riser 30 is described as forming an undulating conduction path, it is understood that each conduction riser 30 may form varying conduction paths that may take any shape suitable for evenly cooling the upper layers during the additive manufacturing process.

Referring specifically to FIG. 4A, baffle 44 is manufactured with conduction risers 30 integrally located on the first side of baffle 44. The first side of baffle 44 may be the supply side of baffle 44, which is the side of baffle 44 located opposite the exit side of baffle 44. In this way, conduction risers 30 may be built on baffle 44 such that conduction risers 30 do not interfere with the operation of baffle 44 as previously designed. Thus, baffle may be a previously designed baffle and conduction risers 44 may be located on the baffle in such a way that the baffle may be additively manufactured without any functional redesign. While conduction risers 30 are described as being on a supply side of baffle 44, it is understood that conduction risers may be placed any location on baffle 44 such that conduction risers 30 adequately distribute heat during the additive manufacturing process. Thus, conduction risers 30 may be added to thin metal parts, such as those for gas turbine engines, in such a way that preexisting designs may be additively manufactured without going through a lengthy redesign process, without thermally deflecting, and without the need for additional vestigial support structures.

Discussion of Possible Embodiments

The following are non-exclusive descriptions of possible embodiments of the present invention.

A method of manufacturing a gas turbine engine component includes generating data defining a thin metal part; determining a build direction of the thin metal part; generating data defining at least one conduction riser, the at least one conduction riser located on a surface of the thin metal part; and manufacturing the thin metal part and the at least one conduction riser using an additive manufacturing process.

The method of the preceding paragraph can optionally include, additionally and/or alternatively, any one or more of the following features, configurations and/or additional components:

The component is manufactured with an additive manufacturing process selected from the group consisting of direct metal laser sintering, electron beam freeform fabrication, electron-beam melting, selective laser melting, and combinations thereof.

The thin metal part and the at least one conduction riser are made from one of nickel or a nickel alloy.

Machining the at least one conduction riser off of the thin metal part.

The thin metal part comprises a baffle for a gas turbine engine.

A gas turbine component comprising a thin metal part made with an additive manufacturing process and at least one conduction riser projecting from a surface of the thin metal part.

The gas turbine component of the preceding paragraph can optionally include, additionally and/or alternatively, any one or more of the following features, configurations and/or additional components:

The thin metal part can be an impingement baffle.

The at least one conduction riser can project from a supply surface of the impingement baffle.

The conduction riser can comprise a continuous bulge projecting from the surface of the thin metal part.

The continuous bulge can have a triangularly-shaped cross-section with fillets

The conduction riser can extend in a build direction of the thin metal part.

The conduction riser can traverse the surface of the thin metal part.

At least a portion of the conduction riser can form an undulating conduction path.

The thin metal part and the conduction riser can be made from one of nickel and a nickel alloy.

A ratio of a thickness of the conduction riser to a thickness of the thin metal part can be about 1:1 to 1.3:1.

A conduction riser for an additively manufactured thin metal part, the conduction riser comprising a projection additively manufactured onto the additively manufactured thin metal part, the projection normal to the thin metal part, the projection traversing the surface of the thin metal part, and the projection having a continuous cross-section.

The conduction riser of the preceding paragraph can optionally include, additionally and/or alternatively, any one or more of the following features, configurations and/or additional components:

The continuous cross-section can be a triangularly-shaped cross-section with fillets.

A ratio of a thickness of the conduction riser to a thickness of the additively manufactured thin metal part can be about 1:1 to 1.3:1.

The projection can extend in a build direction of the thin metal part.

At least a portion of the conduction riser can form an undulating conduction path.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine component comprising:
    a thin metal part, the thin metal part manufactured with an additive manufacturing process, wherein the thin metal part is an impingement baffle, the impingement baffle comprising:
        a supply side disposed opposite an exit side;
        a conduction riser joined to the supply side of the impingement baffle, the conduction riser and the impingement baffle concurrently manufactured with the additive manufacturing process; and
        a plurality of impingement holes extending through the impingement baffle from the supply side to the exit side, wherein at least one impingement holes of the plurality of impingement holes extends through the conduction riser, and wherein the at least one impingement hole is configured to direct a flow of cooling air onto a second gas turbine component.

2. The gas turbine component of claim 1, wherein the conduction riser comprises a continuous bulge projecting from the supply side of the impingement baffle.

3. The gas turbine component of claim 2, wherein the continuous bulge has a triangularly-shaped cross-section with fillets.

4. The gas turbine component of claim 1, wherein the conduction riser extends in a build direction of the thin metal part.

5. The gas turbine component of claim 1, wherein the conduction riser traverses the supply side of the impingement baffle.

6. The gas turbine component of claim 5, wherein at least a portion of the conduction riser forms an undulating conduction path.

7. The gas turbine component of claim 1, wherein the thin metal part and the conduction riser are made from one of nickel and a nickel alloy.

8. The gas turbine component of claim 1, wherein a ratio of a thickness of the conduction riser to a thickness of the thin metal part is 1:1 to 1.3:1, inclusive.

9. A conduction riser for an additively manufactured impingement baffle, the conduction riser comprising:
    a projection additively manufactured onto a supply side surface of the additively manufactured impingement baffle, the projection normal to the supply side surface;
    the projection traversing the supply side surface of the impingement baffle; and
    the projection having a continuous cross-section;
    wherein at least one impingement hole extends through the projection to an exit side of the additively manufactured impingement baffle, the at least one impingement hole configured to direct a flow of cooling air onto a gas turbine component.

10. The conduction riser of claim 9, wherein the continuous cross-section is a triangularly-shaped cross-section with fillets.

11. The conduction riser of claim 9 further comprising:
a ratio of a thickness of the conduction riser to a thickness of the additively manufactured impingement baffle is 1:1 to 1.3:1, inclusive.

12. The conduction riser of claim 9, wherein the conduction riser extends in a build direction of the impingement baffle.

13. The conduction riser of claim 9, wherein at least a portion of the conduction riser forms an undulating conduction path.

* * * * *